United States Patent
Wei et al.

(10) Patent No.: US 10,291,373 B2
(45) Date of Patent: *May 14, 2019

(54) D2D COMMUNICATION CONTROL METHOD AND CONTROL APPARATUS

(71) Applicant: Beijing Zhigu Rui Tuo Tech Co., Ltd, Beijing (CN)

(72) Inventors: Na Wei, Beijing (CN); Weicai Huang, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 286 days.

This patent is subject to a terminal disclaimer.

(21) Appl. No.: 15/166,252

(22) Filed: May 26, 2016

(65) Prior Publication Data

US 2016/0352484 A1 Dec. 1, 2016

(30) Foreign Application Priority Data

May 29, 2015 (CN) .......................... 2015 1 0288807

(51) Int. Cl.
*H04L 5/00* (2006.01)
*H04W 76/14* (2018.01)
(Continued)

(52) U.S. Cl.
CPC .......... *H04L 5/0048* (2013.01); *H04L 5/0023* (2013.01); *H04L 5/0032* (2013.01);
(Continued)

(58) Field of Classification Search
CPC ... H04L 5/0048; H04L 5/0023; H04L 5/0032; H04W 76/14; H04W 16/28
See application file for complete search history.

(56) References Cited

U.S. PATENT DOCUMENTS 9,319,124 B2 4/2016 Seol et al.
9,319,931 B2 4/2016 Lim et al.
(Continued)

FOREIGN PATENT DOCUMENTS

CN 101689911 A 3/2010
CN 101755394 A 6/2010
(Continued)

OTHER PUBLICATIONS

Fodor, et al. "A Distributed Power Control Scheme for Cellular Network Assisted D2D Communications", 2011 IEEE Global Telecommunications Conference (GLOBECOM 2011). Dec. 2011. 6 pages.

(Continued)

*Primary Examiner* — Gbemileke J Onamuti
(74) *Attorney, Agent, or Firm* — Amin, Turocy & Watson, LLP

(57) ABSTRACT

Device to device (D2D) communication control is provided. A method comprises: determining a pilot channel resource used to send at least one directional pilot signal associated with directional D2D communication; and determining a transmit control strategy associated with the directional D2D communication at least according to a received state of the pilot signal on the determined pilot channel resource. A more appropriate D2D communication transmit control strategy can be determined according to a directional pilot signal related to directional D2D communication, thereby providing a basis for more effectively conducting the D2D communication.

38 Claims, 5 Drawing Sheets

(51) Int. Cl.
    *H04W 16/28* (2009.01)
    *H04W 72/04* (2009.01)

(52) U.S. Cl.
    CPC .......... *H04L 5/0069* (2013.01); *H04L 5/0073* (2013.01); *H04L 5/0091* (2013.01); *H04W 16/28* (2013.01); *H04W 72/048* (2013.01); *H04W 76/14* (2018.02)

(56) References Cited

U.S. PATENT DOCUMENTS

| | | | |
|---|---|---|---|
| 9,781,731 | B2 | 10/2017 | Chen et al. |
| 9,820,287 | B2 | 11/2017 | Fujishiro et al. |
| 2007/0082692 | A1 | 4/2007 | Tirkkonen et al. |
| 2007/0287384 | A1 | 12/2007 | Sadri et al. |
| 2009/0015478 | A1 | 1/2009 | Li et al. |
| 2009/0019150 | A1 | 1/2009 | Li et al. |
| 2009/0046653 | A1 | 2/2009 | Singh et al. |
| 2011/0103317 | A1 | 5/2011 | Ribeiro et al. |
| 2013/0078991 | A1* | 3/2013 | Nam ............ H04B 7/024 455/423 |
| 2013/0208587 | A1 | 8/2013 | Bala et al. |
| 2014/0153390 | A1* | 6/2014 | Ishii ............ H04W 28/0289 370/230 |
| 2014/0219095 | A1 | 8/2014 | Lim |
| 2014/0235287 | A1 | 8/2014 | Maltsev et al. |
| 2014/0274088 | A1* | 9/2014 | Talwar ............ H04J 11/0023 455/452.1 |
| 2014/0321367 | A1 | 10/2014 | Marupaduga et al. |
| 2015/0049736 | A1 | 2/2015 | Liu et al. |
| 2015/0119088 | A1 | 4/2015 | Lee et al. |
| 2015/0222345 | A1 | 8/2015 | Chapman et al. |
| 2015/0288427 | A1 | 10/2015 | Wang et al. |
| 2015/0373730 | A1 | 12/2015 | Fujishiro et al. |
| 2015/0382290 | A1 | 12/2015 | Yaacoub |
| 2016/0183286 | A1 | 6/2016 | Park et al. |
| 2016/0270106 | A1 | 9/2016 | Zhou et al. |
| 2016/0352484 | A1 | 12/2016 | Wei et al. |
| 2016/0352485 | A1* | 12/2016 | Wei ............ H04L 5/0048 |
| 2017/0041974 | A1 | 2/2017 | Liao et al. |

FOREIGN PATENT DOCUMENTS

| | | |
|---|---|---|
| CN | 102598844 A | 7/2012 |
| CN | 102833691 A | 12/2012 |
| CN | 103081380 A | 5/2013 |
| CN | 103716776 A | 4/2014 |
| CN | 103718514 A | 4/2014 |
| CN | 104113832 A | 10/2014 |
| CN | 104113851 A | 10/2014 |
| CN | 104244392 A | 12/2014 |
| CN | 104270712 A | 1/2015 |
| CN | 104284407 A | 1/2015 |
| CN | 104301984 A | 1/2015 |
| CN | 104488332 A | 4/2015 |
| WO | 2015005745 A1 | 1/2015 |

OTHER PUBLICATIONS

Yu, et al. "On the Performance of Device-to-Device Underlay Communication with Simple Power Control", IEEE 69th Vehicular Technology Conference, 2009. VTC Spring 2009. Apr. 2009. 5 pages.
Xing, et al. "The investigation of power control schemes for a device-to-device communication integrated into OFDMA cellular system", 2010 IEEE 21st International Symposium on Personal, Indoor and Mobile Radio Communications, Sep. 2010. 6 pages.
Office Action dated Jan. 18, 2018 for U.S. Appl. No. 15/166,229, 34 pages.
Office Action dated Apr. 6, 2018 for U.S. Appl. No. 15/166,257, 44 pages.
Office Action dated Mar. 8, 2018 for U.S. Appl. No. 15/166,240, 24 pages.
Office Action dated Oct. 6, 2017 for U.S. Appl. No. 15/167,809, 23 pages.
Office Action dated May 31, 2018 for U.S. Appl. No. 15/166,229, 31 pages.
Office Action dated May 10, 2018 for U.S. Appl. No. 15/167,809, 18 pages.
Office Action dated Oct. 11, 2018 for U.S. Appl. No. 15/166,240, 27 pages.
Notice of Allowance dated Sep. 24, 2018 for U.S. Appl. No. 15/166,229, 25 pages.
Chinese Office Action for Chinese Application No. 201510288695.2 dated Feb. 3, 2019, 6 pages.
Chinese Office Action for Chinese Application No. 201510289747.8 dated Feb. 11, 2019, 6 pages.
Office Action dated Jan. 2, 2019 for U.S. Appl. No. 15/166,257, 43 pages.
Chinese Office Action for Chinese Application Serial No. 201510288807.4 dated Feb. 3, 2019, 7 pages.
Office Action dated Mar. 8, 2019 for U.S. Appl. No. 15/166,240, 20 pages.

* cited by examiner

US 10,291,373 B2

D2D COMMUNICATION CONTROL METHOD AND CONTROL APPARATUS

RELATED APPLICATION

The present application claims the benefit of priority to Chinese Patent Application No. 201510288807.4, filed with the Chinese Patent Office on May 29, 2015, and entitled "D2D COMMUNICATION CONTROL METHOD AND CONTROL APPARATUS", which application is hereby incorporated herein by reference in its entirety.

TECHNICAL FIELD

Embodiments of the present application relate to the field of Device to Device (D2D) technologies, and, for example, to a D2D communication control method and control apparatus.

BACKGROUND

D2D technologies allow direct communication between terminal devices, and therefore, frequency spectrum efficiency of a cellular communication system may be effectively improved, transmission power of a terminal is reduced, and a problem of lack of frequency spectrum resources of a wireless communication system may be solved to some extent. The D2D mode has been accepted by the 3GPP standards organizations, is applied to a long term evolution (LET) communication system, and has a broad application prospect.

SUMMARY

Therefore, one example, non-limiting object of one or more embodiments of the present application is to provide a D2D communication control solution having higher flexibility and higher interference inhibition efficiency.

Accordingly, a first aspect of example embodiments of the present application provides a D2D communication control method, comprising:

determining a pilot channel resource used to send at least one directional pilot signal associated with directional D2D communication; and determining a transmit control strategy associated with the directional D2D communication at least according to a received state of the pilot signal on the determined pilot channel resource.

In a second aspect, an example embodiment of the present application provides a D2D communication control apparatus, and the apparatus comprises:

a first determination module, configured to determine a pilot channel resource used to send at least one directional pilot signal associated with directional D2D communication; and a second determination module, configured to determine a transmit control strategy associated with the directional D2D communication at least according to a received state of the pilot signal on the determined pilot channel resource.

The method and apparatus of example embodiments of the present application can determine a more appropriate D2D communication transmit control strategy according to a directional pilot signal related to directional D2D communication, thereby providing a basis for more effectively conducting the D2D communication.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
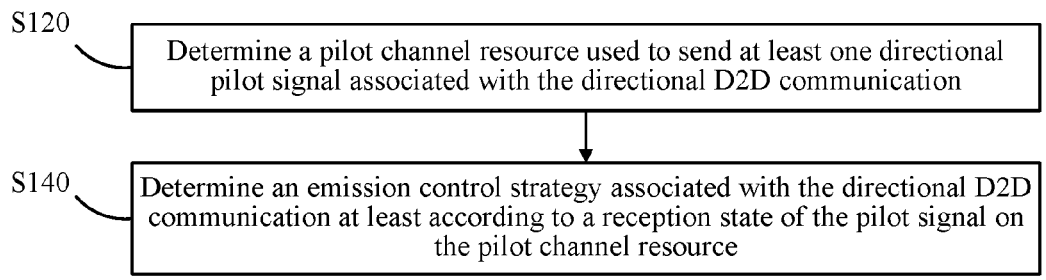
FIG. 1 is an example schematic flow chart of an example of a D2D communication control method according to an embodiment of the present application.

Example embodiments of the present application are further described in detail through accompanying drawings and embodiments. The following embodiments are used to describe the present application, but are not intended to limit the scope of the present application.

Persons skilled in the art should understand that terms such as "first" and "second" in the present application are merely used to distinguish different devices, modules, parameters or the like, and the terms neither represent any specific technical meanings nor indicate necessary logic orders of them.

In embodiments of the present application, the term "directional device to device (D2D) communication" refers to D2D communication using directional transmission over a D2D communication link. The "directional transmission" refers to transmission of a radio frequency signal in a specific direction (also referred to as directed transmission) implemented with one or more directional transmitting antennas, and comprises: transmission in a specific sector direction, or transmission to one receiving end through multiple paths (for example, directional transmit implemented by conducting beam forming with a smart antenna technique).

In a D2D communication under partial cellular networks coverage application scenario, in the case where a D2D communication device uses a dedicated channel, communication in the cellular network will not be interfered. However, when the density of users in a cell is high, the D2D communication will share or reuse frequency resources of cellular users. When the D2D communication and cellular communication reuse the same wireless resource, mutual interference will occur. Along with development of intelligent terminals, more and more terminal devices start to have the directional transmission capability, for example, a terminal implements directional transmission in a manner of beam forming by being provided with a smart antenna. The directional transmission can form spatial separation of a D2D signal from an uplink signal of a co-frequency cellular user (a cellular user reusing a frequency same as that of a D2D user to transmit signal), thereby reducing interference between a D2D user and the co-frequency cellular user. Appropriate control is implemented for possible directional D2D transmission, so as to reduce interference of a D2D user to a co-frequency cellular user, thereby implementing improvement of the overall throughput of the system. The embodiments of the present application provides, based on the possible directional transmission, a D2D communication control solution for helping better implementation of the D2D communication. A pilot signal is a known signal provided by a sender device to a receiver device and used for channel estimation or channel detection. In the embodiments of the present application, directed to the possible directional D2D transmission, a device (preferably, a sender device) involved in the directional D2D communication is enabled to send an uplink directional pilot signal, so as to implement the directional D2D communication according to the directional pilot signal associated with the directional D2D communication.

FIG. 1 is a flow chart of a D2D communication control method according to this example embodiment. The method may be executed by a base station (which comprises the serving cellular cell base station involved in directional D2D communication, and also comprises any neighboring cellular cell base station), executed by a device of any party involved in the directional D2D communication, executed by another user equipment unrelated to the directional D2D communication, and may also be executed by an independent apparatus. As shown in FIG. 1, the method comprises:

S120: Determine a pilot channel resource used to send at least one directional pilot signal associated with the directional D2D communication.

As described in the foregoing, the directional pilot signal refers to a pilot signal transmitting in a specific direction, implemented by means of one or more directional transmitting antennas, and the direction of the directional pilot signal is the same as the direction of the corresponding D2D communication, that is, the same as the direction of sending a data signal between both parties of communication involved in the directional D2D communication. The direction related to the to-be-implemented directional D2D communication may be determined already and unique, for example, uniquely determined by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, the method of this embodiment allocates a specific pilot channel resource for the directional D2D communication. In an example embodiment, directed to each to-be-implemented directional D2D communication, one or more pilot channel resources used to send one or more directional pilot signals may be allocated according to intended control objectives (such as, interference measurement and the selection about direction). The one or more pilot channel resources may be channel resources that have been occupied by other cellular users, may be channel resources that are occupied by directional D2D communications in other directions, and may also be channel resources that have not been occupied by any user.

According to different roles of an execution apparatus of the method of this embodiment, the determination in step S120 may comprise:

S122: Allocate a pilot channel resource used to send at least one directional pilot signal associated with the directional D2D communication, that is, the execution apparatus of the method of this embodiment being a base station of the serving cellular cell involved in the directional D2D communication. Or, S124: Receive information associated with the pilot channel resource. For example, information associated with the allocation of the pilot channel resource from the base station side is received, that is, the execution apparatus of the method of this embodiment is a base station of any neighboring cellular cell involved in the directional D2D communication, or a device of any party in both parties of communication.

After the allocated pilot channel resource is determined, the method of this embodiment further comprises:

S140: Determine a transmit control strategy associated with the directional D2D communication at least according to a received state of the pilot signal on the determined pilot channel resource.

According to the allocation condition of the pilot channel resource, the pilot signal on the pilot channel resource may comprise at least one directional pilot signal sent through the pilot channel resource, and may also comprise a non-directional pilot signal, that is, a pilot signal related to non-directional D2D communication. The received state refers to any information that can reflect the received condition of the pilot signal, and alternatively comprises: a received-signal-strength of the pilot signal, and the like. The pilot signal is a signal used for monitoring/measurement, and according to the received condition of the pilot signal on the pilot channel resource, an interference condition, a channel quality and the like on a corresponding resource may be deduced. Because of the superior advantage of the directional D2D transmission in reducing interference between co-frequency cellular users, the method of this embodiment can determine a transmit control strategy associated with the directional D2D communication according to specific conditions such as interference and channel quality.

In view of the foregoing, the method of this embodiment can determine a more appropriate D2D communication transmit control strategy according to a directional pilot signal related to directional D2D communication, thereby providing a basis for more effectively conducting the D2D communication.

In an example embodiment, the transmit control strategy comprises: a transmit power control strategy associated with the directional D2D communication. Directed to a directional D2D communication link, a transmit power control strategy of a D2D transmit power not limited by an interference condition of a co-frequency cellular user (interference level of an uplink signal sent by the co-frequency cellular user to a base station caused by a signal transmitted over the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment. In such an example embodiment, the step S140 may further comprise:

S142: Determine interference on the pilot channel resource caused by a signal associated with the directional D2D communication.

The interference relates to to-be-implemented directional D2D communication, comprising measuring interference caused by at least one directional pilot signal associated with the to-be-implemented directional D2D communication, and may further comprise prediction on interference that may be caused on a data signal directionally transmitted in the process of the to-be-implemented directional D2D communication. Moreover, the interference may refer to a description on an interference condition, comprising: whether a determination of interference can be/has been made; interference level that can be calculated, and preferably, interference level may be set: such as intense interference, medium interference and weak interference; another parameter associated with the interference that can be determined, for example, signal strength.

S144: Determine the transmit power control strategy at least according to the interference.

A specific transmit power control strategy is made according to whether interference exists, interference level or another parameter associated with the interference determined in step S142. In addition to the interference condition, transmit power levels that can be supported by different devices are different, and the method of this embodiment may further make a specific transmit power control strategy with reference to the maximum transmit power of at least a sender device involved in the directional D2D communication.

It should be noted that, the method of this embodiment may determine interference on the pilot channel resource according to various indicators. In an example embodiment, the interference may be determined according to a received condition of the serving cellular cell base station involved in the directional D2D communication. That is, step S142 may comprise:

S1421: Determine a first received state of a pilot signal received by the serving cellular cell base station involved in the directional D2D communication on the pilot channel resource.

According to different roles of the execution apparatus of the method of this embodiment, in step S1421, the first received state may be determined by calculation or by communication with an external device (for example, the serving cellular cell base station).

S1422: Determine the interference at least according to the first received state.

In another example embodiment, the interference may be determined according to a received condition of at least one neighboring cellular cell base station involved in the directional D2D communication. That is, step S142 may further comprise:

S1423: Determine a second received state of a pilot signal received by the neighboring cell base station involved in the directional D2D communication on the pilot channel resource.

According to different roles of the execution apparatus of the method of this embodiment, in step S1423, the second received state may be determined by calculation or by communication with an external device (for example, the neighboring cell base station).

S1424: Determine the interference at least according to the second received state.

In still another example embodiment, the interference may be determined according to received conditions of both the serving cellular cell base station and at least one neighboring cellular cell base station involved in the directional D2D communication. That is, step S142 may further comprise:

S1425: Determine a first received state of a pilot signal received by the serving cellular cell base station involved in the directional D2D communication on the pilot channel resource, and a second received state of a pilot signal received by the neighboring cell base station involved in the directional D2D communication on the pilot channel resource.

S1426: Determine the interference at least according to the first received state and the second received state.

Alternatively, the received state may comprise: a first received strength of the at least one directional pilot signal on the pilot channel resource, that is, the received strength of the at least one directional pilot signal can be determined, and possible interference may be determined according to the received strength of the pilot signal. The first received state is the received strength of the at least one directional pilot signal received by the serving cellular cell base station involved in the directional D2D communication on the pilot channel resource; and the second received state is the received strength of the at least one directional pilot signal received by the at least one neighboring cellular cell base station involved in the directional D2D communication on the pilot channel resource. The base stations may distinguish the directional pilot signals according to, for example, a pilot configuration, or according to directivity of each pilot signal.

Correspondingly, in step S1422 or step S1424 or step S1426, the interference may be determined at least according to the first received strength and at least one preset strength threshold.

Alternatively, according to experiences or requirements of quality of service, at least one preset strength threshold or threshold range is set, and whether interference exists or interference level is determined according to comparison between the first received strength and the at least one preset strength threshold. For example, when the first received strength is within an intense interference threshold range, it is determined that directional D2D communication associated with the corresponding directional pilot signal will cause intense interference on the corresponding channel resource; when the first received strength is lower than an interference strength lower limit, it is determined that no interference occurs, and the like.

Alternatively, the received state may further comprise: the first received strength of the at least directional pilot signal on the pilot channel resource and a second received strength of a pilot signal unrelated to the directional D2D communication.

In this case, in step S1422 or step S1424 or step S1426, the interference may be determined at least according to the first received strength and the second received strength, that is, the interference is determined under comprehensive consideration of interference conditions of the serving cell base station and the neighboring cell base station caused by the directional D2D communication.

In another example embodiment, the transmit control strategy may comprise: at least one target transmit direction associated with the directional D2D communication. In such an implementation manner, a final transmit direction of the directional D2D communication is not determined yet, for example, there are two or more expected candidate directions, and correspondingly, there are at least one directional pilot signal corresponding to each expected candidate direction. An ideal target transmit direction can be determined according to interference on pilot channel resources corresponding to the pilot signals in different directions and channel quality conditions. Specifically, step S140 may further comprise:

S146: Determine the at least one target transmit direction at least according to the interference and a third received state of the at least one directional pilot signal received by a receiver device involved in the directional D2D communication.

As described in the foregoing, the third received state may comprise: received strength of at least one directional pilot signal corresponding to each direction received by the receiver device involved in the directional D2D communication on the pilot channel resource, which reflects a reception effect that can be implemented in the corresponding direction. At least one ideal target transmit direction may be determined under comprehensive consideration of the interference that may be caused by the directional D2D communication in various directions and reception effects that can be implemented by the directional D2D communication in various directions. For example, at least one target transmit direction in which interference is within a certain degree of range and the optimal reception effect can be implemented is determined.

According to different roles of the execution apparatus of the method of this embodiment, in step S1423, the third received state may be determined by calculation or by communication with an external device (for example, the receiver device involved in the directional D2D communication).

In still another example embodiment, the transmit control strategy comprises: resource allocation associated with the directional D2D communication, that is, a time-frequency resource that should be used in transmitting a data signal associated with the directional D2D communication. In such an implementation manner, the step S140 may further comprise:

S148: Determine the resource allocation associated with the directional D2D communication at least according to the interference and the third received state of the at least one directional pilot signal received by the receiver device involved in the directional D2D communication.

Specifically, in step S120, the same pilot channel resource may be allocated for respective at least one directional pilot signal involved in two or more directional D2D communication. According to the interference determined in step S142, interference caused by a directional pilot signal related to each D2D communication on each pilot channel resource and/or interference that might be caused by a data signal may be determined. A received condition of a data signal related to each D2D communication and sent on each pilot channel resource may be determined according to the third received state, and in consideration of factors in both aspects, an ideal resource allocation strategy for each directional D2D communication may be determined. For example, the same time-frequency resource is allocated for two or more directional D2D communication that has low mutual interference and has desirable reception conditions, so as to emit data signals.

According to different roles of an execution apparatus of the method of this embodiment, the method of this embodiment may further comprise:

S160: Send information associated with the pilot channel resource.

Directed to different control objectives, the allocation condition of the pilot channel resource determined in step S120 may be informed to devices of multiple parties. In an example embodiment, the allocation condition of the pilot channel resource may be used for the serving cellular cell base station involved in each directional D2D communication to conduct interference measurement, and when the execution apparatus of the method of this embodiment is the base station, the base station may directly use the allocation condition to monitor a corresponding channel resource. In an implementation manner in which the execution apparatus of the method of this embodiment is independent to the base station, the method of this embodiment informs the base station of the resource allocation condition by communicating with the base station. Moreover, in an example embodiment, step S160 may comprise:

S162: Send the information associated with the pilot channel resource to at least the sender device involved in the directional D2D communication, so that at least the sender device can send at least one directional pilot signal according to the allocated pilot channel resource.

In another example embodiment, step S160 may further comprise:

S164: Send the information associated with the pilot channel resource to at least one neighboring cell base station involved in the directional D2D communication. In such an implementation manner, one or more neighboring cell base stations may monitor corresponding channel resources according to the allocation condition of the pilot channel resource, for a possible local cell and/or neighboring cell to conduct interference measurement.

In still another example embodiment, step S160 may further comprise:

S166: Send the information associated with the pilot channel resource to at least one user equipment in a cellular cell involved in the directional D2D communication. In such an implementation manner, the one or more other user equipment may listen corresponding channel resources according to the allocation condition of the pilot channel resource, and may comprise the receiver device involved in the directional D2D communication. The received condition of the receiver device on the directional pilot signal reflects a reception effect that can be implemented in the corresponding direction, and provides a reference of implementing the control on the directional D2D communication in this aspect.

In view of the foregoing, the method of this embodiment allocates, for directional D2D communication, a pilot channel resource used to send a directional pilot signal, and informs the resource allocation condition to a base station and a user equipment of the serving cell and/or a base station and a user equipment of a neighboring cell, and the like, thereby providing references for implementing the directional D2D communication in many aspects.

Moreover, according to the different roles of the execution apparatus of the method of this embodiment, in an implementation manner in which the execution body of the method of the embodiment is the serving cellular cell base station involved in the directional D2D communication, the method of this embodiment may further comprise:

S180: Send information associated with the transmit control strategy.

Further, according to the different roles of the execution apparatus of the method of this embodiment, in an implementation manner in which the execution apparatus of the method of the embodiment is a device of at least one party in both parties of communication, the method of this embodiment may further comprise:

S170: Send at least one directional pilot signal at least on the determined pilot channel resource.

S190: Emit a data signal associated with the directional D2D communication at least according to the transmit control strategy.

A person skilled in the art should understand that in the above method of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

In addition, an embodiment of the present application further provides a computer readable medium, comprising computer readable instructions for performing the following operations when being executed: executing operations of the steps in the method in the embodiment shown in FIG. 1.

Figure 2A:
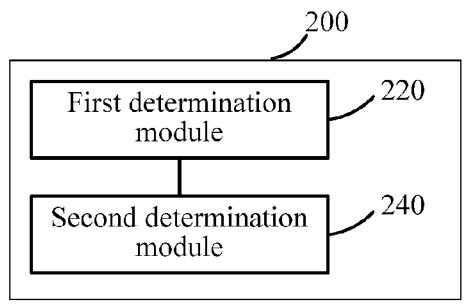
FIG. 2(a) to FIG. 2(i) are example schematic structural diagrams of various examples of a D2D communication control apparatus according to an embodiment of the present application.

An embodiment of the present application further provides an apparatus for executing the D2D communication control method, and FIG. 2(a) is a structural diagram of an exemplary D2D communication control apparatus. The apparatus may belong to a base station (which comprises the serving cellular cell base station involved in directional D2D communication, and also comprises any neighboring cellular cell base station), a device of any party involved in the directional D2D communication, another user equipment unrelated to the directional D2D communication, and may also be an independent apparatus. As shown in FIG. 2(a), the apparatus 200 comprises:

a first determination module 220, configured to determine a pilot channel resource used to send at least one directional pilot signal associated with directional D2D communication.

As described in the foregoing, the directional pilot signal refers to a pilot signal transmitting in a specific direction, implemented by means of one or more directional transmitting antennas, and the direction of the directional pilot signal is the same as the direction of the corresponding D2D communication, that is, the same as the direction of sending a data signal between both parties of communication involved in the directional D2D communication. The direction related to the to-be-implemented directional D2D communication may be determined already and unique, for example, uniquely determined by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, the apparatus of this embodiment allocates a specific pilot channel resource for the directional D2D communication. In an example embodiment, directed to each to-be-implemented directional D2D communication, one or more pilot channel resources used to send one or more directional pilot signals may be allocated according to intended control objectives (such as, interference measurement and the selection about direction)). The one or more pilot channel resources may be channel resources that have been occupied by other cellular users, may be channel resources that are occupied by directional D2D communications in other directions, and may also be channel resources that have not been occupied by any user.

According to different roles of the apparatus of this embodiment, the first determination module 220 may allocate a pilot channel resource used to send at least one directional pilot signal associated with the directional D2D communication, that is, the apparatus 200 of this embodiment belongs to a base station of the serving cellular cell involved in the directional D2D communication. Or, The first determination module 220 may receive information associated with the pilot channel resource. For example, information associated with the allocation of the pilot channel resource from the base station side is received, that is, the apparatus 200 of this embodiment is a base station of any neighboring cellular cell involved in the directional D2D communication, or a device of any party in both parties of communication.

The apparatus 200 of this embodiment further comprises:

a second determination module 240, configured to determine a transmit control strategy associated with the directional D2D communication at least according to a received state of the pilot signal on the determined pilot channel resource.

According to the allocation condition of the pilot channel resource, the pilot signal on the pilot channel resource may comprise at least one directional pilot signal sent through the pilot channel resource, and may also comprise a non-directional pilot signal, that is, a pilot signal related to non-directional D2D communication. The received state refers to any information that can reflect the received condition of the pilot signal, and alternatively comprises: the received-signal-strength of the pilot signal, and the like. The pilot signal is a signal used for monitoring/measurement, and according to the received condition of the pilot signal on the pilot channel resource, an interference condition, a channel quality and the like on a corresponding resource may be deduced. Because of the superior advantage of the directional D2D transmission in reducing interference between co-frequency cellular users, the apparatus of this embodiment can determine a transmit control strategy associated with the directional D2D communication according to specific conditions such as interference and channel quality.

In view of the foregoing, the apparatus of this embodiment can determine a more appropriate D2D communication transmit control strategy according to a directional pilot signal related to directional D2D communication, thereby providing a basis for more effectively conducting the D2D communication.

Figure 2B:
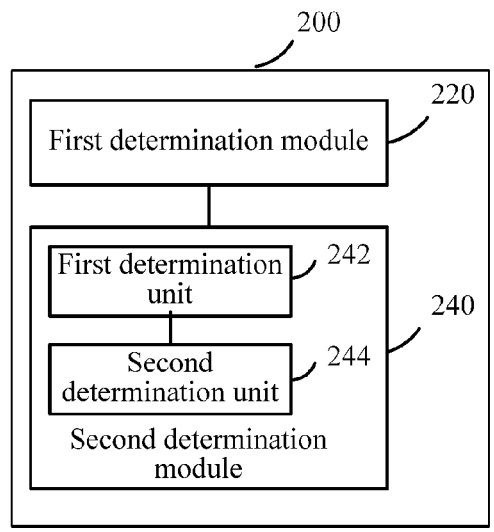

In an example embodiment, the transmit control strategy comprises: a transmit power control strategy associated with the directional D2D communication. Directed to a directional D2D communication link, a transmit power control strategy of a D2D transmit power not limited by an interference condition of a co-frequency cellular user (interference level of an uplink signal sent by the co-frequency cellular user to a base station caused by a signal transmitted over the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment. In such an implementation manner, as shown in FIG. 2(b), the second determination module 240 may further comprise: a first determination unit 242 and a second determination unit 244.

The first determination unit 242 is configured to determine interference on the pilot channel resource caused by a signal associated with the directional D2D communication.

The interference relates to to-be-implemented directional D2D communication, comprising measuring interference caused by at least one directional pilot signal associated with the to-be-implemented directional D2D communication, and may further comprise prediction on interference that may be caused on a data signal directionally transmitted in the process of the to-be-implemented directional D2D communication. Moreover, the interference may refer to a description on an interference condition, comprising: whether a determination of interference can be/has been made; interference level that can be calculated, and preferably, interference level may be set: such as intense interference, medium interference and weak interference; another parameter associated with the interference that can be determined, for example, signal strength.

The second determination unit 244 is configured to determine the transmit power control strategy at least according to the interference. In addition to the interference condition, transmit power levels that can be supported by different devices are different, and the second determination unit 244 may further make a specific transmit power control strategy with reference to the maximum transmit power of at least a sender device involved in the directional D2D communication.

A specific transmit power control strategy is made according to whether interference exists, a level of the degree of interference or another parameter associated with the interference determined by the first determination unit 242.

Figure 2C:
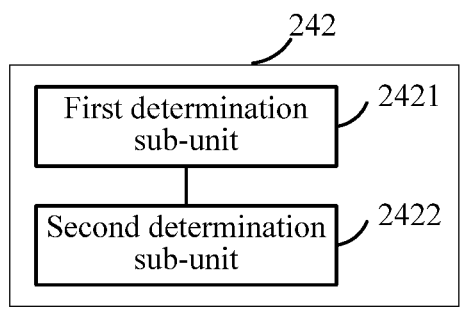

It should be noted that, the apparatus of this embodiment may determine interference on the pilot channel resource according to various indicators. In an example embodiment, the interference may be determined according to a received condition of the serving cellular cell base station involved in the directional D2D communication. That is, as shown in FIG. 2(c), the first determination module 242 may comprise: a first determination sub-unit 2421 and a second determination sub-unit 2422.

The first determination sub-unit 2421 is configured to determine a first received state of a pilot signal received by the serving cellular cell base station involved in the directional D2D communication on the pilot channel resource.

According to different roles of the execution body of the method of this embodiment, the first determination sub-unit 2421 may determine the first received state by calculation or by communication with an external device (for example, the serving cellular cell base station).

The second determination sub-unit 2422 is configured to determine the interference at least according to the first received state.

Figure 2D:
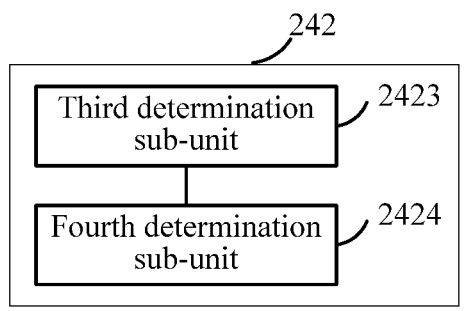

In another example embodiment, the interference may be determined according to a received condition of at least one neighboring cellular cell base station involved in the directional D2D communication. That is, as shown in FIG. 2(d), the first determination module 242 may further comprise: a third determination sub-unit 2423 and a fourth determination sub-unit 2424.

The third determination sub-unit 2423 is configured to determine a second received state of a pilot signal received by the neighboring cellular cell base station involved in the directional D2D communication on the pilot channel resource.

According to different roles of the apparatus of this embodiment, the third determination sub-unit 2423 may determine the second received state by calculation or by communication with an external device (for example, the neighboring cellular cell base station).

The fourth determination sub-unit 2424 is configured to determine the interference at least according to the second received state.

Figure 2E:
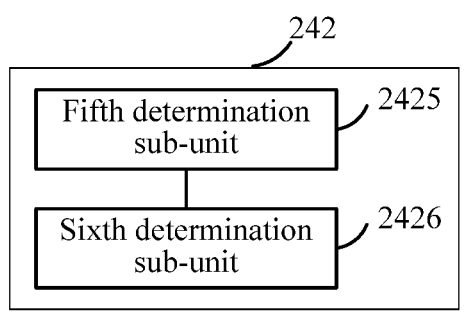

In still another example embodiment, the interference may be determined according to reception conditions of both the serving cellular cell base station and at least one neighboring cellular cell base station involved in the directional D2D communication. That is, as shown in FIG. 2(e), the first determination module 242 may further comprise: a fifth determination sub-unit 2425 and a sixth determination sub-unit 2426.

The fifth determination sub-unit 2425 is configured to determine a first received state of a pilot signal received by the serving cellular cell base station involved in the directional D2D communication on the pilot channel resource, and a second received state of a pilot signal received by the neighboring cell base station involved in the directional D2D communication on the pilot channel resource.

The sixth determination sub-unit 2426 is configured to determine the interference at least according to the first received state and the second received state.

Alternatively, the received state may comprise: a first received strength of the at least one directional pilot signal on the pilot channel resource, that is, the received strength of the at least one directional pilot signal can be determined, and possible interference may be determined according to the received strength of the pilot signal. The first received state is the received strength of the at least one directional pilot signal received by the serving cellular cell base station involved in the directional D2D communication on the pilot channel resource; and the second received state is the received strength of the at least one directional pilot signal received by the at least one neighboring cellular cell base station involved in the directional D2D communication on the pilot channel resource. The base stations may distinguish the directional pilot signals according to, for example, a pilot configuration, or according to directivity of each pilot signal.

Correspondingly, the first determination unit 242 may determine the interference at least according to the first received strength and at least one preset strength threshold.

Alternatively, according to experiences or requirements of quality of service, at least one preset strength threshold or threshold range is set, and whether interference exists or interference level is determined according to comparison between the first received strength and the at least one preset strength threshold. For example, when the first received strength is within an intense interference threshold range, it is determined that directional D2D communication associated with the corresponding directional pilot signal will cause intense interference on the corresponding channel resource; when the first received strength is lower than an interference strength lower limit, it is determined that no interference occurs, and the like.

Alternatively, the received state may further comprise: the first received strength of the at least directional pilot signal on the pilot channel resource and a second received strength of a pilot signal unrelated to the directional D2D communication.

In this case, the second determination unit 242 may determine the interference at least according to the first received strength and the second received strength, that is, the interference is determined under comprehensive consideration of interference conditions of the serving cell base station and the neighboring cell base station caused by the directional D2D communication.

Figure 2F:
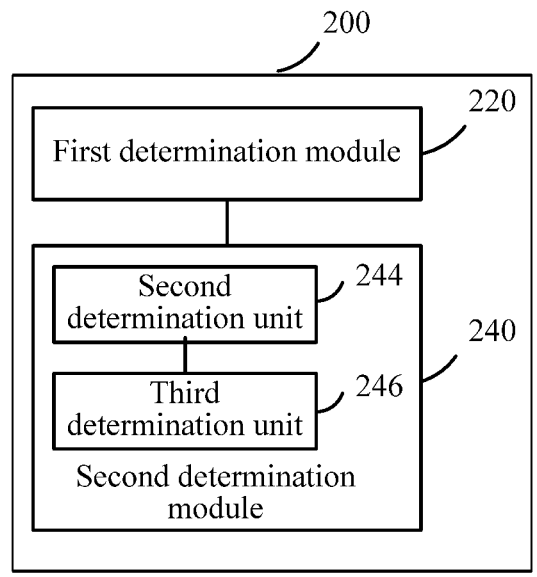

In another example embodiment, the transmit control strategy may comprise: at least one target transmit direction associated with the directional D2D communication. In such an implementation manner, a final transmit direction of the directional D2D communication is not determined yet, for example, there are two or more expected candidate directions, and correspondingly, there are at least one directional pilot signal corresponding to each expected candidate direction. An ideal target transmit direction can be determined according to interference on pilot channel resources corresponding to the pilot signals in different directions and channel quality conditions. Specifically, as shown in FIG. 2(f), the second determination module 240 may further comprise:

a third determination unit 246, configured to determine the at least one target transmit direction at least according to the interference and a third received state of a receiver device involved in the directional D2D communication receiving the at least one directional pilot signal.

As described in the foregoing, the third received state may comprise: received strength of at least one directional pilot signal corresponding to each direction received by the receiver device involved in the directional D2D communication on the pilot channel resource, which reflects a reception effect that can be implemented in the corresponding direction. Ideal at least one target transmit direction may be determined under comprehensive consideration of the interference that may be caused by the directional D2D communication in various directions and reception effects that can be implemented by the directional D2D communication in various directions. For example, at least one target transmit direction in which interference is within a certain degree of range and the optimal reception effect can be implemented is determined.

According to different roles of the apparatus of this embodiment, the third determination unit 246 may determine the third received state by calculation or by communication with an external device (for example, the receiver device involved in the directional D2D communication).

Figure 2G:
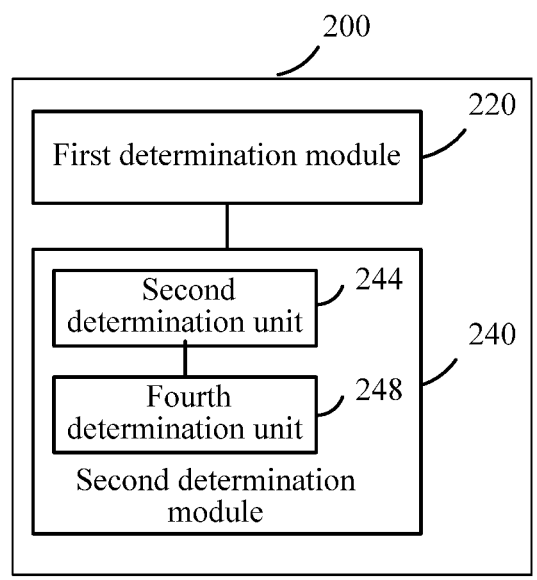

In still another example embodiment, the transmit control strategy comprises: resource allocation associated with the directional D2D communication, that is, a time-frequency resource that should be used in transmitting a data signal associated with the directional D2D communication In such an implementation manner, as shown in FIG. 2(g), the second determination module 240 may further comprise:

a fourth determination unit 248, configured to determine the resource allocation associated with the directional D2D communication at least according to the interference and the third received state of the at least one directional pilot signal received by the receiver device involved in the directional D2D communication.

Specifically, the first determination module 220 may allocate the same pilot channel resource for respective at least one directional pilot signal related to two or more directional D2D communication. According to the interference determined by the first determination unit 242, interference caused by a directional pilot signal related to each D2D communication on each pilot channel resource and/or interference that might be caused by a data signal may be determined. A reception condition of a data signal involved in each D2D communication and sent on each pilot channel resource may be determined according to the third received state, and in consideration of factors in both aspects, an ideal resource allocation strategy for each directional D2D communication may be determined. For example, the same time-frequency resource is allocated for two or more directional D2D communication that has low mutual interference and has desirable reception conditions, so as to emit data signals.

Figure 2H:
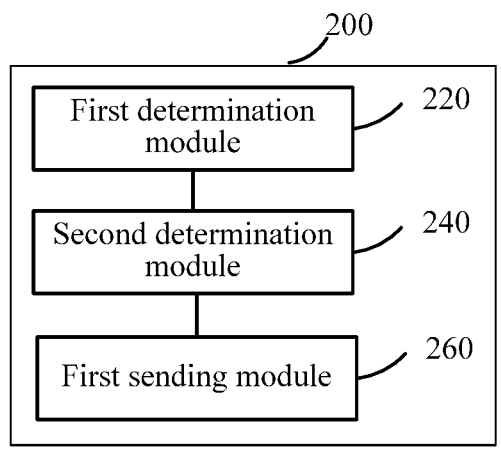

Moreover, according to the different roles of the apparatus of this embodiment, the apparatus 200 of this embodiment shown in FIG. 2(h) may further comprise:

a first sending module 260, configured to send information associated with the pilot channel resource.

Directed to different control objectives, the allocation condition of the pilot channel resource determined by the first determination module 220 may be informed to devices of multiple parties. In an example embodiment, the allocation condition of the pilot channel resource may be used for the serving cellular cell base station involved in each directional D2D communication to conduct interference measurement, and when the apparatus of this embodiment belongs to the base station, it may directly use the allocation condition to monitor a corresponding channel resource. In an implementation manner in which the apparatus of this embodiment is independent to the base station, the apparatus of this embodiment informs the base station of the resource allocation condition by communicating with the base station. Moreover, in an example embodiment, the first sending module 260 may send the information associated with the pilot channel resource to at least the sender device involved in the directional D2D communication, so that at least the sender device can send at least one directional pilot signal according to the allocated pilot channel resource.

In another example embodiment, the first sending module 260 may further send the information associated with the pilot channel resource to at least one neighboring cell base station involved in the directional D2D communication. In such an implementation manner, one or more neighboring cell base stations may monitor corresponding channel resources according to the allocation condition of the pilot channel resource, for a possible local cell and/or neighboring cell to conduct interference measurement and the like.

In still another example embodiment, the first sending module 260 may further send the information associated with the pilot channel resource to at least one user equipment in a cellular cell involved in the directional D2D communication. In such an implementation manner, the one or more other user equipment may listen corresponding channel resources according to the allocation condition of the pilot channel resource, and may comprise the receiver device involved in the directional D2D communication. The received condition of the receiver device on the directional pilot signal reflects a reception effect that can be implemented in the corresponding direction, and provides a reference of implementing the control on the directional D2D communication in this aspect.

In view of the foregoing, the apparatus of this embodiment allocates, for directional D2D communication, a pilot channel resource used to send a directional pilot signal, and informs the resource allocation condition to a base station and a user equipment of the serving cell and/or a base station and a user equipment of a neighboring cell, and the like, thereby providing references for implementing the directional D2D communication in many aspects.

Moreover, according to the different roles of the apparatus of this embodiment, in an implementation manner in which the apparatus of the embodiment belongs to the serving cellular cell base station involved in the directional D2D communication, the first sending module 260 may further send information associated with the transmit control strategy.

Figure 2I:
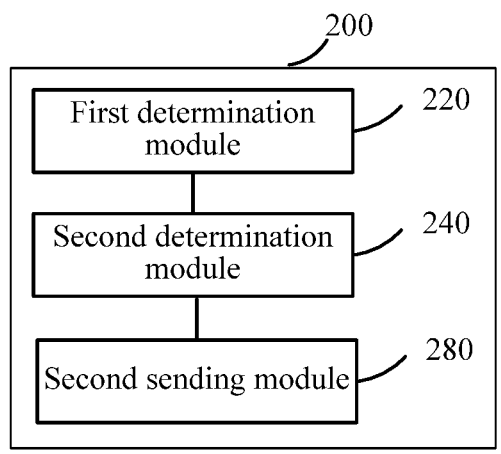

Further, according to the different roles of the apparatus of this embodiment, in an implementation manner in which the apparatus of the embodiment belongs to a device of at least one party in both parties of communication, as shown in FIG. 2(i), the apparatus 200 of this embodiment may further comprise:

a second sending module 280, configured to send at least one directional pilot signal at least on the determined pilot channel resource. The second sending module 280 may further be configured to emit a data signal associated with the directional D2D communication at least according to the transmit control strategy.

Figure 3:
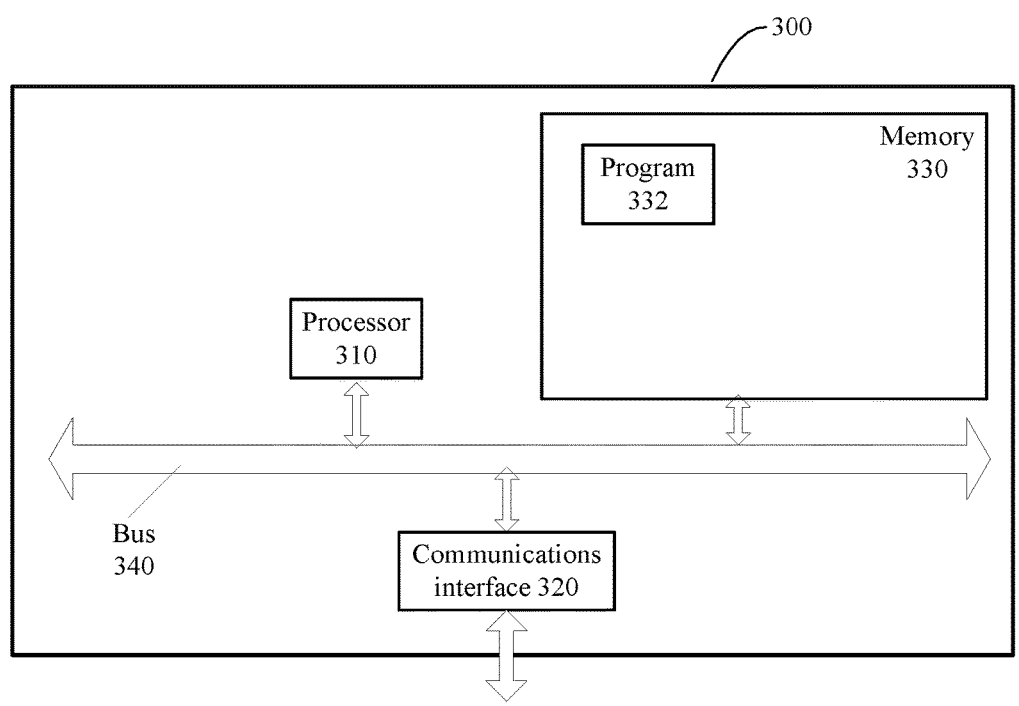
FIG. 3 is an example schematic structural diagram of another example of a D2D communication control apparatus according to an embodiment of the present application.

FIG. 3 is a schematic structural diagram of a D2D communication control apparatus 300 provided in an embodiment of the present application, and the implementation of the D2D communication control apparatus 300 is not limited by the implementation of the present application. As shown in FIG. 3, the D2D communication control apparatus 300 may comprise:

A processor 310, a communications interface 320, a memory 330, and a communications bus 340, where:

The processor 310, the communications interface 320, and the memory 330 complete mutual communications with each other through the communications bus 340.

The communications interface 320 is configured to communicate with a network element such as a client.

The processor 310 is configured to execute a program 332, and specifically can implement related functions of the D2D communication control apparatus in the apparatus embodiment of FIG. 2(*a*).

Specifically, the program 332 may comprise a program code. The program code comprises a computer operating instruction.

The processor 310 may be a central processing unit CPU or an Application Specific Integrated Circuit (ASIC), or be configured to be one or more integrated circuits configured to implement the embodiments of the present application. The program 332 may specifically used to cause the D2D communication control apparatus 300 to execute the following steps:

determining a pilot channel resource used to send at least one directional pilot signal associated with directional D2D communication; and at least according to a received state of the pilot signal on the determined pilot channel resource, determining a transmit control strategy associated with the directional D2D communication.

Steps in the program 332 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

It can be clearly understood by persons skilled in the art that, for the purpose of convenient and brief description, for a detailed working process of the described devices and modules, reference may be made to the corresponding descriptions in the foregoing apparatus embodiment, and the details will not be described herein again.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a allocated computing environment in which a task is executed by using remote processing devices connection through a communications network. In the allocated computing environment, the program module may be located in storage devices of both the serving memory and a remote memory.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the embodiments of the present application essentially, or the part contributing to the prior art, or part of the embodiments may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
    determining, by a system comprising a processor, a pilot channel resource used to send at least one directional pilot signal associated with a directional device to device (D2D) communication, wherein the directional D2D communication refers to D2D communication using directional transmission over a D2D communication link, the directional transmission refers to transmission of a radio frequency signal in a first specific direction, and a directional pilot signal of the at least one directional pilot signal refers to a pilot signal transmitting in a second specific direction; and determining a transmit control strategy associated with the directional D2D communication at least according to a received state of the at least one directional pilot signal on the pilot channel resource.

2. The method of claim 1, wherein the transmit control strategy comprises: a transmit power control strategy associated with the directional D2D communication, and wherein the determining the transmit control strategy comprises:

determining an interference on the pilot channel resource caused by a signal associated with the directional D2D communication; and determining the transmit power control strategy at least according to the interference.

3. The method of claim 2, wherein the received state is a first received state, wherein the transmit control strategy comprises: at least one target transmit direction associated with the directional D2D communication, and wherein the determining the transmit control strategy comprises:

determining the at least one target transmit direction at least according to the interference and a second received state of the at least one directional pilot signal received by a receiver device involved in the directional D2D communication.

4. The method of claim 2, wherein the received state is a first received state, wherein the transmit control strategy comprises: a resource allocation associated with the directional D2D communication, and wherein the determining the transmit control strategy comprises:

determining the resource allocation associated with the directional D2D communication at least according to the interference and a second received state of the at least one directional pilot signal received by the receiver device involved in the directional D2D communication.

5. The method of claim 2, wherein the received state is a first received state, wherein the determining the interference comprises:

determining a second received state of a first pilot signal received by a serving cell base station device involved in the directional D2D communication on the pilot channel resource; and determining the interference at least according to the second received state.

6. The method of claim 5, wherein the first received state comprises: a first received strength of the at least one directional pilot signal on the pilot channel resource, and wherein the determining the interference comprises:

determining the interference at least according to the first received strength and at least one preset strength threshold.

7. The method of claim 5, wherein the first received state comprises:

a first received strength of the at least one directional pilot signal on the pilot channel resource and a second received strength of a second pilot signal unrelated to the directional D2D communication, and wherein the determining the interference comprises:

determining the interference at least according to the first received strength and the second received strength.

8. The method of claim 2, wherein the received state is a first received state, wherein the determining the interference comprises:

determining a second received state of a first pilot signal received by a neighboring cell base station device involved in the directional D2D communication on the pilot channel resource; and determining the interference at least according to the second received state.

9. The method of claim 2, wherein the received state is a first received state, wherein the determining the interference comprises:

determining a second received state of a first pilot signal received by a serving cell base station device involved in the directional D2D communication on the pilot channel resource, and a third received state of a second pilot signal received by a neighboring cell base station device involved in the directional D2D communication on the pilot channel resource; and determining the interference at least according to the second received state and the third received state.

10. The method of claim 1, wherein the determining the pilot channel resource comprises:

allocating the pilot channel resource used to send at least one directional pilot signal associated with the directional D2D communication, and wherein the method further comprises:

sending information associated with the pilot channel resource.

11. The method of claim 10, wherein the sending the information associated with the pilot channel resource comprises:

sending the information associated with the pilot channel resource to at least a sender device involved in the directional D2D communication.

12. The method of claim 10, wherein the sending the information associated with the pilot channel resource comprises:

sending the information associated with the pilot channel resource to at least one neighboring cell base station device involved in the directional D2D communication.

13. The method of claim 10, wherein the sending the information associated with the pilot channel resource comprises:

sending the information associated with the pilot channel resource to at least one user equipment, in a cellular network of at least one network device involved in the directional D2D communication.

14. The method of claim 1, further comprising:

sending information associated with the transmit control strategy.

15. The method of claim 1, wherein the determining the pilot channel resource comprises:

receiving information associated with the pilot channel resource.

16. The method of claim 15, further comprising:

sending the at least one directional pilot signal at least on the pilot channel resource.

17. The method of claim 1, wherein the determining the transmit control strategy associated with the directional D2D communication comprises:

receiving information associated with the transmit control strategy.

18. The method of claim 17, further comprising:

transmitting a data signal associated with the directional D2D communication at least according to the transmit control strategy.

19. An apparatus, comprising:
a memory that stores executable modules; and
a processor, coupled to the memory, that executes or facilitates execution of the executable modules, the executable modules comprising:
  a first determination module configured to determine a pilot channel resource used to send at least one directional pilot signal associated with a directional device to device (D2D) communication, wherein the directional D2D communication refers to D2D communication using directional transmission over a D2D communication link, the directional transmission refers to transmission of a radio frequency signal in a first specific direction, and a directional pilot signal of the at least one directional pilot signal refers to a pilot signal transmitting in a second specific direction; and
  a second determination module configured to determine a transmit control strategy associated with the directional D2D communication at least according to a first received state of the directional pilot signal on the pilot channel resource.

20. The apparatus of claim 19, wherein the transmit control strategy comprises: a transmit power control strategy associated with the directional D2D communication, and wherein the second determination module comprises:
  a first determination unit configured to determine an interference on the pilot channel resource caused by a signal associated with the directional D2D communication; and
  a second determination unit configured to determine the transmit power control strategy at least according to the interference.

21. The apparatus of claim 20, wherein the transmit control strategy comprises: a target transmit direction associated with the directional D2D communication, and wherein the first determination module comprises:
  a third determination unit configured to determine the target transmit direction at least according to the interference and a second received state of a receiver device involved in the directional D2D communication receiving the directional pilot signal.

22. The apparatus of claim 20, wherein the transmit control strategy comprises: a resource allocation associated with the directional D2D communication, and wherein the first determination module comprises:
  a fourth determination unit configured to determine the resource allocation associated with the directional D2D communication at least according to the interference and a second received state of the directional pilot signal received by the receiver device involved in the directional D2D communication.

23. The apparatus of claim 20, wherein the first determination unit comprises:
  a first determination sub-unit configured to determine a second received state of a first pilot signal received by a serving cell base station device involved in the directional D2D communication on the pilot channel resource; and
  a second determination sub-unit configured to determine the interference at least according to the second received state.

24. The apparatus of claim 23, wherein the first received state comprises:
  a first received strength of the directional pilot signal on the pilot channel resource, and
  wherein the second determination unit is configured to determine the interference at least according to the first received strength and a preset strength threshold.

25. The apparatus of claim 23, wherein the first received state comprises:
  a first received strength of the directional pilot signal on the pilot channel resource and a second received strength of a second pilot signal unrelated to the directional D2D communication, and
  wherein the second determination unit is configured to determine the interference at least according to the first received strength and the second received strength.

26. The apparatus of claim 20, wherein the first determination unit comprises:
  a third determination sub-unit configured to determine a second received state of a first pilot signal received by a neighboring cellular cell base station device involved in the directional D2D communication on the pilot channel resource; and
  a fourth determination sub-unit configured to determine the interference at least according to the second received state.

27. The apparatus of claim 20, wherein the first determination unit comprises:
  a fifth determination sub-unit configured to determine a second received state of a first pilot signal received by a serving cellular cell base station device involved in the directional D2D communication on the pilot channel resource, and a third received state of a second pilot signal received by the neighboring cell base station device involved in the directional D2D communication on the pilot channel resource; and
  a sixth determination sub-unit configured to determine the interference at least according to the second received state and the third received state.

28. The apparatus of claim 19, wherein the first determination module is configured to allocate the pilot channel resource used to send the directional pilot signal associated with the directional D2D communication; and
  wherein the executable modules further comprise:
    a first sending module configured to send information associated with the pilot channel resource.

29. The apparatus of claim 28, wherein the first sending module is configured to send the information associated with the pilot channel resource to at least a sender device involved in the directional D2D communication.

30. The apparatus of claim 28, wherein the first sending module is configured to send the information associated with the pilot channel resource to a neighboring cell base station device involved in the directional D2D communication.

31. The apparatus of claim 28, wherein the first sending module is configured to send the information associated with the pilot channel resource to a user equipment of a cellular network involved in the directional D2D communication.

32. The apparatus of claim 28, wherein the first sending module is further configured to send information associated with the transmit control strategy.

33. The apparatus of claim 28, wherein the executable modules further comprise:
  a second sending module configured to send the directional pilot signal or another directional pilot signal at least on the pilot channel resource.

34. The apparatus of claim 28, wherein the executable modules further comprise:
  a second sending module configured to emit a data signal associated with the directional D2D communication at least according to the transmit control strategy.

35. The apparatus of claim 19, wherein the second determination module is configured to receive a pilot channel resource used to send a directional pilot signal associated with the directional D2D communication.

36. The apparatus of claim 19, wherein the second determination module is configured to receive information associated with the transmit control strategy.

37. A computer readable storage device, comprising at least one executable instruction, which, in response to execution, causes a system comprising a processor to perform operations, comprising:

determining a pilot channel resource used to send at least one directional pilot signal associated with a directional device to device (D2D) communication, resulting in a determined pilot channel resource, wherein the directional D2D communication refers to D2D communication using directional transmission over a D2D communication link, the directional transmission refers to transmission of a radio frequency signal in a first specific direction, and a directional pilot signal of the at least one directional pilot signal refers to a pilot signal transmitting in a second specific direction; and determining a transmit control strategy associated with the directional D2D communication at least according to a received state of the directional pilot signal on the determined pilot channel resource.

38. A device for device to device (D2D) communication control comprising a processor and memory, wherein the memory stores executable instructions, the processor being connected with the memory via a communication bus, and when the device is operating, the processor executes or facilitates execution of the executable instructions stored by the memory to perform operations comprising:

determining a pilot channel resource used to send at least one directional pilot signal associated with a directional D2D communication, wherein the directional D2D communication refers to D2D communication using directional transmission over a D2D communication link, the directional transmission refers to transmission of a radio frequency signal in a first specific direction, and a directional pilot signal of the at least one directional pilot signal refers to a pilot signal transmitting in a second specific direction; and determining a transmit control strategy associated with the directional D2D communication at least according to at least one received state of the at least one directional pilot signal on the pilot channel resource.

* * * * *